United States Patent
Rumsby et al.

(10) Patent No.: US 11,853,493 B2
(45) Date of Patent: *Dec. 26, 2023

(54) METHOD OF MANUFACTURING A TOUCH SENSITIVE PANEL

(71) Applicant: M-SOLV LIMITED, Oxford (GB)

(72) Inventors: Philip Rumsby, Oxford (GB); Adam Brunton, Oxford (GB)

(73) Assignee: M-SOLV LIMITED, Oxford (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/849,478

(22) Filed: Jun. 24, 2022

(65) Prior Publication Data

US 2022/0334663 A1     Oct. 20, 2022

Related U.S. Application Data

(63) Continuation of application No. 16/978,999, filed as application No. PCT/GB2019/050440 on Feb. 19, 2019, now Pat. No. 11,385,731.

(30) Foreign Application Priority Data

Mar. 8, 2018  (GB) .................................. 18037234

(51) Int. Cl.
    *G06F 3/041*     (2006.01)

(52) U.S. Cl.
    CPC .... *G06F 3/041* (2013.01); *G06F 2203/04103* (2013.01)

(58) Field of Classification Search
    CPC .................. G06F 3/041; G06F 2203/04103
    See application file for complete search history.

(56) References Cited

U.S. PATENT DOCUMENTS

| 8,881,388 B2 | 11/2014 | Milne |
| 9,292,141 B2 | 3/2016 | Zhong et al. |

(Continued)

FOREIGN PATENT DOCUMENTS

| GB | 2472613 A | 2/2011 |
| TW | 201106240 A | 2/2011 |

(Continued)

OTHER PUBLICATIONS

Taiwanese Office Action regarding Application No. 108107536 dated Dec. 9, 2022. Search Report translation provided by JA Kemp LLP.

*Primary Examiner* — Temesghen Ghebretinsae
*Assistant Examiner* — Sosina Abebe
(74) *Attorney, Agent, or Firm* — Harness, Dickey & Pierce, P.L.C.

(57) ABSTRACT

A method of manufacturing a transparent conductive film for a touch sensitive panel, comprising: providing a layered structure comprising a plurality of homogeneous layers which include at least a first transparent conductive layer, a second transparent conductive layer, and a transparent support substrate between the first transparent conductive layer and the second transparent conductive layer, the transparent support substrate being the thickest layer of the layered structure; forming an electrode pattern in the first transparent conductive layer by laser ablation of the first transparent layer by a laser beam incident on the first transparent layer from a side of the transparent support substrate on which the first transparent layer is provided; wherein the laser beam and transparent support substrate are configured such that the laser beam energy density is reduced by 50% or more by the transparent support substrate.

22 Claims, 2 Drawing Sheets

(56) References Cited

U.S. PATENT DOCUMENTS

Figure 1:
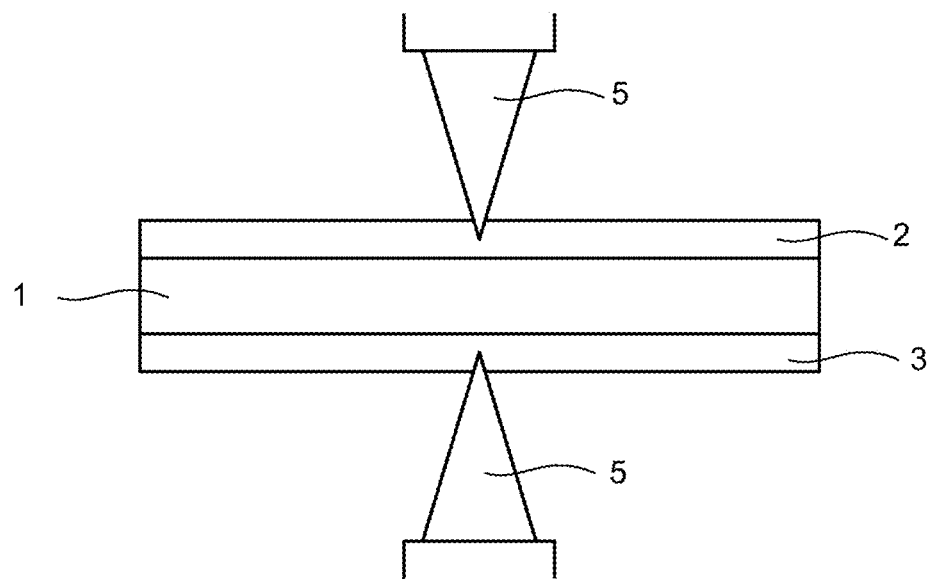

| | | |
|---|---|---|
| 9,377,918 B2 | 6/2016 | Chan |
| 2012/0169664 A1* | 7/2012 | Milne ................... G06F 3/0445 |
| | | 219/121.72 |
| 2014/0009429 A1 | 1/2014 | Verweg et al. |
| 2014/0041904 A1 | 2/2014 | Pedder |
| 2014/0202742 A1 | 7/2014 | Jones et al. |
| 2014/0242525 A1* | 8/2014 | Majumdar .............. C08L 65/00 |
| | | 430/324 |
| 2014/0338960 A1* | 11/2014 | Inoue ................... H05K 1/0274 |
| | | 174/253 |
| 2015/0305166 A1 | 10/2015 | Fried et al. |
| 2015/0370374 A1* | 12/2015 | Chan .................... H05K 1/0274 |
| | | 219/121.68 |
| 2016/0001496 A1 | 1/2016 | Chow et al. |
| 2016/0004349 A1 | 1/2016 | Prieto Rio et al. |

FOREIGN PATENT DOCUMENTS

| | | |
|---|---|---|
| TW | 201403437 A | 1/2014 |
| TW | 201442081 A | 11/2014 |

* cited by examiner

METHOD OF MANUFACTURING A TOUCH SENSITIVE PANEL

CROSS REFERENCE TO RELATED APPLICATIONS

This application is a continuation application of U.S. application Ser. No. 16/978,999 filed Sep. 8, 2020, and claiming priority to U.S. National Phase Application under 35 U.S.C. 371 of International Application No. PCT/GB2019/050440 filed on Feb. 19, 2019, which claims the benefit of priority from Great Britain Patent Application No. 1803723.4 filed on Mar. 8, 2018. The entire disclosures of all of the above applications are incorporated herein by reference.

FIELD

The invention relates to a method of manufacturing a touch sensitive panel. In particular, the invention relates to a method comprising forming electrode patterns in a transparent conductive layer by laser ablation.

BACKGROUND

Capacitive touch panel technology is in wide use, for example in mobile phones, tablet computers, personal digital assistants, handheld games consoles, satellite navigation systems, and other user interface consoles.

In such devices, an XY array of sensing electrodes is formed in layers of transparent conductive material. In use, capacitance forms between the user's fingers and the projected capacitance from the sensing electrodes. A touch is made, precisely measured and translated into a command which is executed by underlying electronic devices for an appropriate software application. Such panels enjoy the benefits of responding accurately to both fingers and styli.

One particular form of touch panel technology has two separated transparent conducting layers and it is the changes in the mutual capacitance between the layers at the intersection points of the electrode arrays that are detected.

The transparent conductive layers are each divided into a plurality of discrete electrode cells which are electrically connected in a first orthogonal direction but electrically isolated in a second orthogonal direction. The electrode pattern may be the same for both layers or may be different.

One method of forming an electrode pattern in the transparent conductive layers is to use a laser beam to ablate portions of the conductive layers from the surface of a transparent support substrate. Such a method provides a higher throughput and it lowers cost than alternative methods such as chemical etching of the electrode pattern.

Typically, the transparent conductive layers may be formed from indium tin oxide (ITO) or a nanomaterial comprising metal nanowires, or carbon nanotubes, for example. The transparent support substrate is typically formed from a flexible polymer, for example a film of polyethylene terephthalate (PET). PET is most widely used because it is inexpensive to produce.

However, forming an electrode pattern in a first transparent conductive layer using a laser beam can cause damage to a second transparent conductive layer formed on the other side of the substrate to the first transparent conductive layer. Various attempts have been made to address or circumvent this problem.

In one example, the second conductive layer is formed only after the electrode pattern has been formed in the first conductive layer. However, in this example, throughput is compromised. In another example, the first and second conductive layers are formed from different materials, having different ablation thresholds. However, manufacturing costs are higher as a result. In another example, lenses are configured to diverge the laser beam as it passes through the support substrate to reduce the energy density at the far side of the substrate. However, manufacturing costs are higher as a result. In another example, an additional light blocking layer is added between the conductive layers and the substrate to protect the far-side conductive layer while the electrode pattern is formed in the near-side conductive layer. However, the touch sensitive panel is thicker and manufacturing costs are higher as a result.

The present invention aims to at least partially address some of the problems discussed above.

Accordingly, the present invention provides a method of manufacturing a touch sensitive panel, comprising: providing a layered structure comprising a plurality of homogeneous layers which include at least a first transparent conductive layer, a second transparent conductive layer, and a transparent support substrate between the first transparent conductive layer and the second transparent conductive layer, the transparent support substrate being the thickest layer of the layered structure; forming an electrode pattern in the first transparent conductive layer by laser ablation of the first transparent layer by a laser beam incident on the first transparent layer from a side of the transparent support substrate on which the first transparent layer is provided; wherein the laser beam and transparent support substrate are configured such that the laser beam energy density is reduced by 50% or more by the transparent support substrate.

By selecting the laser and the material of the transparent support substrate in accordance with the invention, the transparent support substrate itself can be used to absorb and/or diffuse laser energy in such a way as to prevent damage to the second transparent conductive layer, while the electrode pattern is formed in the first conductive transparent layer. Such a manufacturing method does not require additional layers or additional different materials for the layers. Accordingly, the method is relative inexpensive, is able maintain a high throughput and produces a relatively thin touch panel.

The laser beam may have a wavelength of from 200 nm to 400 nm, for example 266 nm or 355 nm. Such laser beams can be produced relatively inexpensively and reliably, for example using diode-pumped solid state laser devices.

The transparent support substrate may be formed from a material comprising one of colourless polyimide (CPI), polyetherimide (PEI), polyether ether ketone (PEEK), polycarbonate (PC) and PET. The transparent support substrate may be formed from a material comprising at least 90% by weight of one of CPI, PEI, PC, PEEK and PET. The transparent transport substrate may consist essentially of one of CPI, PEI, PC, PEEK and PET. CPI, PEI and PEEK have desirable absorption characteristics in a wavelength range around 355 nm. PET and PC have desirable absorption characteristics in a wavelength range around 266 nm.

The present invention also provides a transparent conductive film for a touch sensitive panel, having a layered structure comprising: a plurality of homogenous layers which include at least a first transparent conductive layer, a second transparent conductive layer, and a transparent support substrate between the first transparent conductive layer and the second transparent conductive layer, the transparent support substrate being the thickest layer of the layered structure; wherein the transparent support layer is formed from a material comprising one of CPI, PEI, PC and PEEK.

BRIEF DISCRIPTION OF THE DRAWINGS

Figure 2:
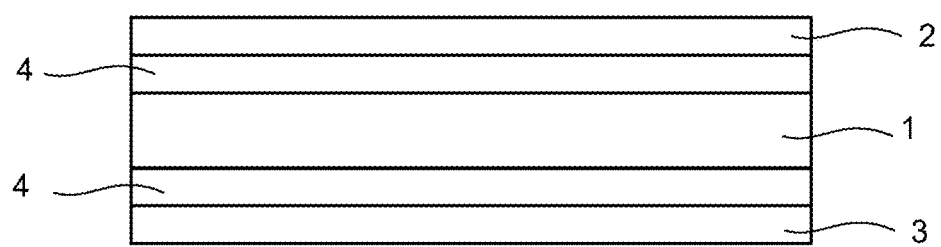
Figure 3:
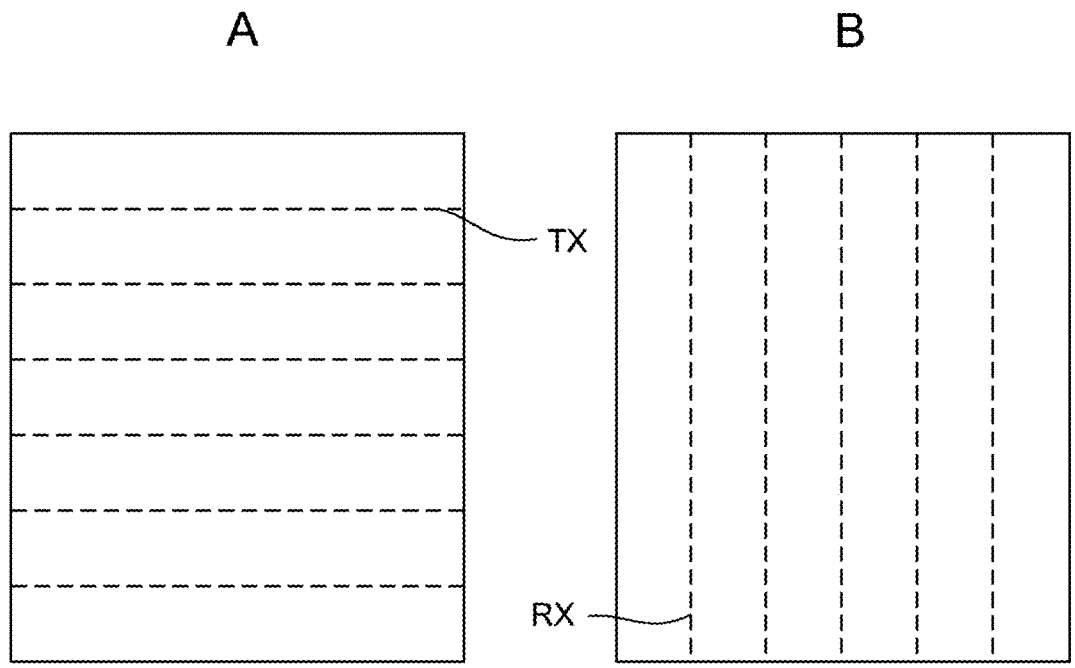
Figure 4:
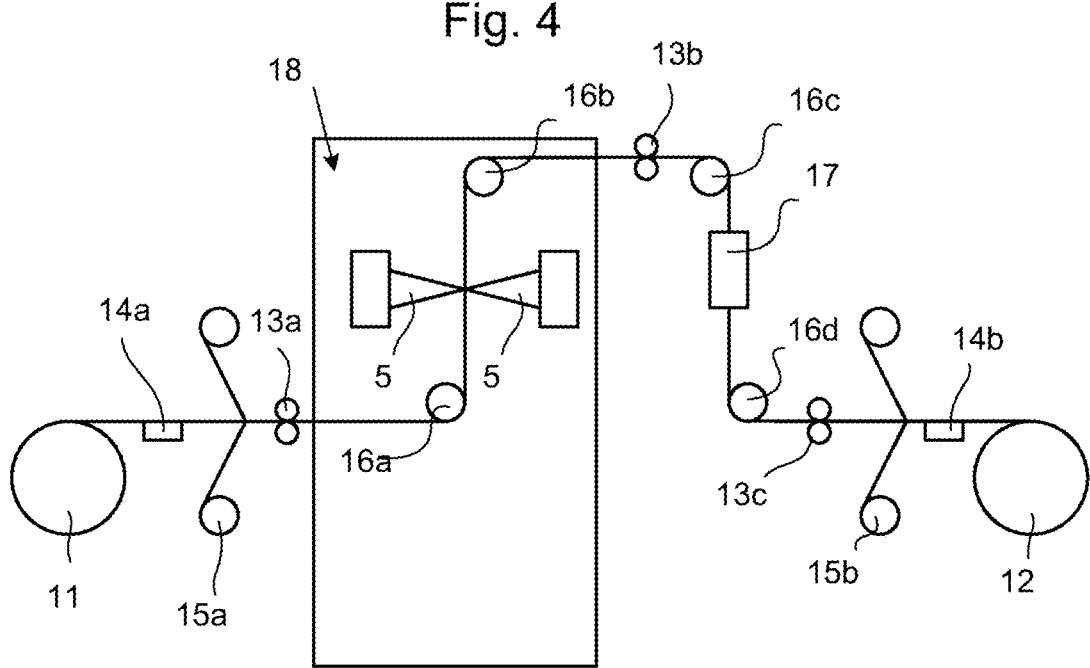

Further features and advantages of the invention will be described below by way of non-limiting examples, together with the accompanying drawings, in which:

FIG. 1 schematically shows an example transparent conductive film for a touch sensitive panel;

FIG. 2 schematically shows an example transparent conductive film for a touch sensitive panel; and FIGS. 3A and 3B show example electrode patterns formed in first and second transparent conductive layers;

FIG. 4 schematically shows an example apparatus for carrying out the method of the invention.

DETAILED DESCRIPTION OF EMBODIMENTS

FIG. 1 shows a cross-section through a transparent conductive film for a touch sensitive panel. The transparent conductive film comprises a layered structure comprising a plurality of homogenous layers. As shown in FIG. 1 these layers may comprise a first transparent conductive layer 2, a second transparent conductive layer 3, and a transparent support substrate 1 between the first transparent conductive layer 2 and the second transparent conductive layer 3. The transparent support substrate 1 provides stability to the transparent conductive film. Accordingly, it is the thickest layer in the film. The transparent support substrate 1 may account for 50% or more, or 75% or more, of the thickness of the transparent conductive film, for example.

Further layers may be provided. For example, as shown in FIG. 2, an additional adhesive layer 4 may be provided between the transparent support substrate 1 and the transparent conductive layers 2,3 in order to improve adhesion of the transparent conductive layers 2, 3 to the transparent support substrate 1. The adhesive layers 4 may be provided directly between the transparent conductive layers 2, 3 and the transparent support substrate 1, respectively. In other words, the adhesive layers may contact both the transparent conductive layers 2, 3 and the transparent support substrate 1, respectively. However, the adhesive layers 4 are not required, they are optional. For example, the transparent conductive layers 2, 3 may be provided directly on opposite surfaces of the transparent support substrate 1, as shown in FIG. 1.

The transparent support substrate 1 is transparent to visible light and may be electrically insulating. The transparent support substrate 1 may be rigid or may be flexible. The transparent support substrate 1 may be made of a polymer material, for example. Such materials include PET, CPI, PEI, PC and PEEK. The thickness of the transparent support substrate 1 may be less than 1 mm. For example, the transparent support substrate 1 may be at least 0.01 mm thick and/or less than 0.15 mm thick. The transparent support substrate 1 may be around 0.05 mm thick, for example. A thinner support substrate 1 make a more flexible film. However, if the transparent support substrate 1 becomes too thin, it is difficult to handle.

The first and second transparent conductive layers 2, 3 may be formed from an inorganic oxide material such as indium tin oxide (ITO), tin oxide (SnO2), zinc oxide (ZnO), or other transparent conductive oxides (such as fluorine doped tin oxide (FTO)). Such materials may be applied by physical vapour deposition, for example. However, other methods may also be used. Other materials may be used for the transparent conductive layers, for example nano particle materials. Nano-particle materials may include metal nanowires (e.g. silver nanowires, AgNW), carbon nanotubes (CNT), carbon nanobuds (CNB), or graphene, for example. Such nanoparticle materials may be applied by printing onto the substrate 1 or by a transfer film. The first and second transparent conductive layers 2, 3 may have a thickness of from 30 nm to 300 nm. The sheet resistances of the transparent conductive layers 2, 3 may be from 10 ohms/square to 30 ohms/square.

The transparent support substrate 1 and the transparent conductive layers 2, 3 may respectively and/or in combination have an optical transmission in the visible wavelength range of at least 85%, or at least 90%.

FIGS. 3A and 3B respectively show example electrode patterns formed in the first and second transparent conductive layers 2, 3. These Figures show plan views of opposite faces of the transparent conductive film. The electrodes patterns formed in each of the transparent conductive layers 2, 3 comprise parallel lines. These parallel lines are orthogonal and form transmit electrodes (TX), and receive electrodes (RX). Alternatively, different electrode patterns may be formed in the first and second transparent conductive layers 2, 3.

The electrode patterns may be formed by laser ablation of the transparent conductive layers 2, 3 by a laser beam 5. As shown in FIG. 1, a laser beam 5 may be incident on the first transparent conductive layer 2 from a side of the transparent support substrate 1 on which the first transparent layer 2 is provided. Further, a laser beam 5 may be incident on the second transparent conductive layer 3 from a side of the transparent support substrate 1 on which the second transparent conductive layer 3 is provided. Also as shown in FIG. 1, the formation of the electrode patterns in the first transparent conductive layer 2 and the second transparent conductive layer 3 may be performed simultaneously.

The electrode patterns are formed by laser ablation of the transparent conductive layers 2, 3. In other words, the laser beam 5 breaks the bond between the transparent conductive layers 2, 3 and the substrate 1. The transparent conductive layers 2, 3 may have a laser ablation threshold energy density of from 0.5 J per cm2 to 1 J per cm2, for example.

The laser beam 5 may have an ultraviolet (UV) wavelength. For example, the laser beam wavelength may be between 200 nm and 400 nm. The laser beam wavelength may be between 200 nm and 300 nm, or alternatively between 300 nm and 400 nm. For example, the laser beam wavelength may be 266 nm or 355 nm. The laser beam 5 may be produced by a diode-pumped solid state laser, for example. The laser beam 5 may be pulsed. The energy density of the laser beam 5, within the transparent conductive layer 2, 3 being processed, or at an interface between the transparent conductive layer 2, 3 and an adjacent layer, may be equal to or greater than the laser ablation threshold of the transparent conductive layers 2, 3. In other words, the energy density of the laser beam 5 may be of from 0.5 J per cm2 to 1 J per cm2, or higher, for example. Optical elements, e.g. lenses and/or mirrors may be used to focus the laser beams 5. The laser beam 5 may be focused at the side of the transparent conductive layers 2, 3 furthest from the laser beam 5.

The transparent support substrate 1 is configured such that the laser beam energy density is reduced by 50% or more by the transparent support substrate 1. The laser beam energy density may be reduced by 75% or more by the transparent support substrate 1. In other words, the material and thickness of the transparent support substrate is such that 50% or more of the laser energy is absorbed by the transparent support substrate 1. The transparent support substrate material and thickness, and the laser wavelength and energy density may be mutually selected such that during laser ablation, the laser beam energy density is reduced by 50% or more by the transparent support substrate 1.

The transparent support substrate 1 may be formed from a polymeric material which, having a thickness of from 0.01 mm to 0.15 mm, absorbs 50% or more of laser energy incident thereon having a wavelength of from 200 nm to 400 nm and an energy density sufficient to ablate an conductive layer (e.g. 0.5 J per cm2 to 1 J per cm2 or higher) and transmits at 90% or more of visible light incident thereon.

In one embodiment of the present invention, a 355 nm laser is used to form the electrode pattern and the transparent support substrate 1 is formed from CPI and has a thickness of around 0.05 mm. CPI has a relatively high absorption at 355 nm. Therefore, the laser beam energy density is reduced by more than 50% as the laser beam 5 passes through the transparent support substrate 1. PEI, PC and PEEK are also suitable substrate materials for use with a 355 nm laser and may be substituted.

In another embodiment of the present invention, a 266 nm laser is used to form the electrode pattern and the transparent support substrate 1 is formed from PET and has a thickness of around 0.05 mm. PET has a relatively high absorption at 266 nm. Therefore, the laser beam energy density is reduced by more than 50% as the laser beam 5 passes through the transparent support substrate 1. PC is also suitable substrate material for use with a 266 nm laser and may be substituted.

Until now, CPI, PEI, PC or PEEK have not been considered for use as a substrate material in touch sensitive panels. PET is the preferred substrate material for touch sensitive panels. However, the inventors have found that CPI, PEI, PC and PEEK have the surprising effect of efficiently absorbing laser radiation in a wavelength range including 355 nm, while being sufficiently transparent at visible wavelengths.

Further, until now, PET has not been considered for use as a substrate material in touch sensitive panels together with an electrode forming method using a UV laser wavelength without additional blocking layers being provided on the substrate. However, the inventors have found that PET has the surprising effect of efficiently absorbing laser radiation in a wavelength range including 266 nm. Accordingly, a PET substrate can be used without the need for a blocking layer, if used in combination with an appropriate laser wavelength.

FIG. 4 shows an example apparatus 10 for manufacturing the transparent conductive film of the invention. The transparent conductive film, including the first and second transparent conductive layers 2, 3 on the transparent support substrate 1 are provided on a first reel 11. The transparent conductive film is unwound from the first reel 11 and then subjected to the laser beams 5 to form the electrode patterns. The transparent conductive film with the electrode patterns formed thereon may be rewound onto a second reel 12.

As shown in FIG. 4, the apparatus 10 may further comprise driving rollers 13 for driving the transparent conductive film through the apparatus, i.e. from the first reel 11 to the second reel 12. In the example apparatus shown, three pairs of driving rollers 13a, 13b and 13c are provided. The first and seconds reels 11, 12 may also be driven.

The apparatus 10 may further comprise at least one tension pickup 15. In the example apparatus 10 shown in FIG. 4, two tension pickups 15a, 15b are provided, one adjacent the first reel 11 and the other adjacent the second reel 12. The tension pickups 15 are configured to adjust the tension of the transparent conductive film by pressing on the transparent conductive film with a given pressure.

The apparatus 10 may further comprise a cleaning unit 17, downstream of the laser beams 5, for cleaning the transparent conductive film of debris resulting from the laser ablation process, before the transparent conductive film is rewound onto the second reel 12. The cleaning unit 17 may eject a stream of gas, such as air, onto the transparent conductive film to clean it.

The apparatus 10 may further comprise film protection units 15. For example, as shown in FIG. 4, two film protection units 15a, 15b may be provided, one adjacent the first reel 11 and the other adjacent the second reel 12. The protection units 15a, 15b protect the film as it unwinds and rewinds.

The apparatus 10 may further comprise additional rollers 16 for changing the direction of travel of the transparent conductive film between the first reel 11 and the second reel 12.

It may be advantageous to unwind the transparent conductive film from the first reel 11 and rewind the transparent conductive film onto the second reel 12 in a substantially horizontal direction in order to reduce tension on the transparent conductive film. However, it may also be advantageous to form the electrode patterns while the transparent conductive film is substantially vertical. This is in order to prevent sagging of the transparent conductive film, which may reduce the accuracy of the electrode patterning process. Accordingly, a first roller 16a may be provided between the first reel 11 and the laser beam 5 to change the direction of the transparent conductive reel from substantially horizontal to substantially vertical. Further, a second roller 16b may be provided between the laser beam 5 and the second reel 12 to change the direction of the transparent conductive film from substantially vertical back to substantially horizontal.

Additional rollers 16d and 16e may be provided between the second roller 16b and the second reel 12 in order to reduce the overall length of the apparatus 10 in the horizontal direction, for example in order to accommodate the cleaning unit 17, as shown in FIG. 4.

When forming the electrode pattern, the transparent support substrate 1 may be driven relative to the laser beam 5 in a sub-scanning direction (direction up/down the page in FIG. 4) and the laser beam 5 may be driven relative to the transparent support substrate 1 in a main-scanning direction (direction into/out of the page in FIG. 4).

The invention claimed is:

1. A method of manufacturing a transparent conductive film for a touch sensitive panel, comprising:
   providing a layered structure comprising a plurality of homogeneous layers which include at least a first transparent conductive layer, a second transparent conductive layer, and a transparent support substrate between the first transparent conductive layer and the second transparent conductive layer, the transparent support substrate being the thickest layer of the layered structure;
   forming an electrode pattern in the first transparent conductive layer by laser ablation of the first transparent layer by a laser beam incident on the first transparent layer from a side of the transparent support substrate on which the first transparent layer is provided; wherein
   the laser beam and transparent support substrate are configured such that during laser ablation, the material and thickness of the transparent support substrate are such that the laser beam energy density is reduced by 75% or more by absorption by the transparent support substrate;
wherein the first and/or second transparent conductive layers have an ablation threshold of from 0.5 Jcm$^{-2}$ to 1 Jcm$^{-2}$.

2. The method of claim 1, further comprising: forming an electrode pattern in the second transparent conductive layer by laser ablation of the second transparent layer by a laser beam incident on the second transparent layer from a side of the transparent support substrate on which the second transparent layer is provided.

3. The method of claim 2, wherein the steps of forming the electrode pattern in the first transparent conductive layer and forming the electrode pattern in the second transparent conductive layer are performed simultaneously.

4. The method of claim 1, wherein the wavelength of the laser beam is ultraviolet.

5. The method of claim 4, wherein the wavelength of the laser beam is from 300 nm to 400 nm.

6. The method of claim 5, wherein the wavelength of the laser beam is 355 nm.

7. The method of claim 5, wherein the transparent support substrate comprises one of colorless polyimide (CPI), polyetherimide (PEI), and polyether ether ketone (PEEKI).

8. The method of claim 3, wherein the wavelength of the laser beam is from 200 nm to 300 nm.

9. The method of claim 8, wherein the wavelength of the laser beam is 266 nm.

10. The method of claim 8, wherein the transparent support substrate comprises one of polyethylene therephthalate (PET) and polycarbonate (PC).

11. The method of claim 1, wherein the laser beam is produced by a diode-pumped solid state laser.

12. The method of claim 1, wherein the energy density of the laser beam at the surface of the substrate is from 0.5 Jcm$^{-2}$ to 1 Jcm$^{-2}$.

13. The method of claim 1, wherein the thickness of the transparent support substrate is from 0.01 mm to 0.15 mm.

14. The method of claim 1, wherein the first and/or second transparent conductive layers are formed from ITO.

15. The method of claim 1, wherein the first and/or second transparent conductive layers are formed from nanowires, carbon nanotubes or carbon nanobuds.

16. The method of claim 1, wherein the first and/or second transparent conductive layers are attached directly to the transparent support substrate.

17. The method of claim 1, wherein the first and/or second transparent conductive layers are attached to the transparent support substrate by a transparent adhesive layer.

18. The method of claim 1, wherein the first and/or second transparent conductive layers have a thickness of between 30 nm and 300 nm.

19. The method of claim 1, wherein the layered structure is unwound from a first reel prior to forming to the electrode pattern.

20. The method of claim 1, wherein the layered structure is wound onto a second reel after forming the electrode pattern.

21. The method of claim 1, wherein in the step of forming the electrode pattern, the transparent support substrate is driven relative to the laser beam in a sub-scanning direction and the laser beam is driven relative to the transparent support substrate in a main-scanning direction.

22. The method of claim 21, wherein the sub-scanning direction is substantially vertical.

* * * * *